(12) United States Patent
Kahle et al.

(10) Patent No.: US 6,557,953 B1
(45) Date of Patent: May 6, 2003

(54) FRAME FOR TRACK APPARATUS

(75) Inventors: Glenn W. Kahle, New Franklin, MO (US); David L. Juncker, Mt. Vernon, IN (US); Jamsheed Reshad, Newburgh, IN (US); Clarence A. Juncker, Mt. Vernon, IN (US); Kenneth J. Juncker, Mt. Vernon, IN (US); Lloyd E. Juncker, Mt. Vernon, IN (US)

(73) Assignee: AgTracks, Inc., Mount Vernon, IN (US)

( * ) Notice: Subject to any disclaimer, the term of this patent is extended or adjusted under 35 U.S.C. 154(b) by 0 days.

(21) Appl. No.: 09/627,860

(22) Filed: Jul. 28, 2000

(51) Int. Cl.[7] .......................... B62D 55/14; B62D 55/12
(52) U.S. Cl. ...................... 305/135; 305/130; 305/138
(58) Field of Search ............................. 305/124, 129, 305/130, 135, 138

(56) References Cited

U.S. PATENT DOCUMENTS

| | | | |
|---|---|---|---|
| 3,689,123 A | 9/1972 | Barbieri | 305/135 |
| 3,841,424 A * | 10/1974 | Purcell et al. | 180/9.5 |
| 4,448,273 A | 5/1984 | Barbieri | 180/9.21 |
| 4,553,790 A * | 11/1985 | Boggs | 305/124 |
| 5,018,591 A | 5/1991 | Price | 180/9.5 |
| 5,240,084 A | 8/1993 | Christianson | 180/9.21 |
| 5,607,210 A | 3/1997 | Brazier | 305/131 |
| 5,829,848 A * | 11/1998 | Kelderman | 305/15 |
| 5,899,543 A * | 5/1999 | Lykken et al. | 305/131 |
| 5,954,148 A | 9/1999 | Okumura et al. | 180/9.21 |
| 6,062,662 A * | 5/2000 | Witt | 305/130 |
| 6,074,025 A * | 6/2000 | Juncker et al. | 305/130 |
| 6,318,484 B2 * | 11/2001 | Lykken et al. | 180/9.48 |

* cited by examiner

*Primary Examiner*—Russell D. Stormer
(74) *Attorney, Agent, or Firm*—Jansson, Shupe & Munger, Ltd.

(57) ABSTRACT

A track apparatus of the type mountable on a rotatable axle of a vehicle is provided with a frame having excellent rigidity. The frame, which is preferably of unique uni-body construction, includes first and second portions that define a drive wheel receipt well therebetween for receiving the drive wheel of the track apparatus.

32 Claims, 8 Drawing Sheets

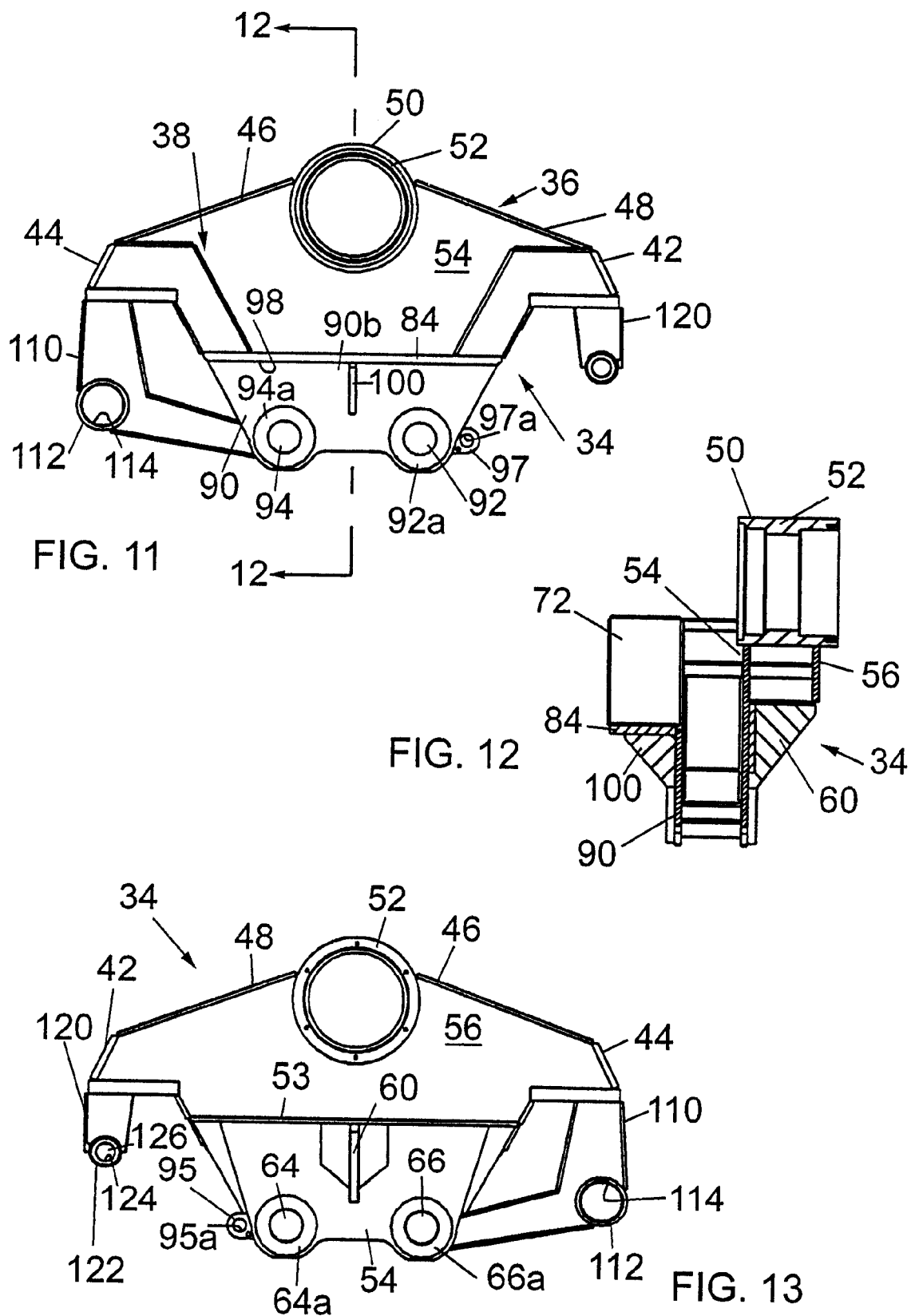

FRAME FOR TRACK APPARATUS

FIELD OF THE INVENTION

This invention relates generally to track apparatus for vehicles and, more particularly, to track apparatus of the type for use in place of a vehicle wheel.

BACKGROUND OF THE INVENTION

Agricultural vehicles such as tractors, combines and the like are commonly used in agricultural fields for a variety of jobs, and construction vehicles and other large work vehicles are used for many different jobs on a variety of pound surfaces. Typically, these vehicles have tires on which the vehicles are supported on the ground. These kinds of large vehicles are quite heavy, mid their weight is distributed to a relatively small area by the vehicle dyes. As a result the tires of such vehicles tend to compact the soil in the fields or other ground surfaces. Compacted soil discourages growth of crop planted in the fields which need loose soil to flourish, and ground surface compaction is often undesirable for other reasons as well.

In addition, since fields and other work sites are often wet due to rain or watering, vehicles which enter the fields become bogged down in the mud due to the fact that there is such a small tire area in contact wit the ground. Therefore, it is highly desirable to develop a track apparatus for vehicles which spreads vehicle weight over a larger area so as to reduce the degree of pound compaction. Providing a larger ground-surface engagement area also serves to prevent vehicles from becoming bogged down in mud or other soft pound surfaces.

Prior track apparatuses for vehicles are disclosed in U.S. Pat. Nos. Re36,284 (Kelderman) and 5,829,848 (Kelderman), assigned to the assignee of the print invention and incorporated herein by reference. The Kelderman '284 reissue and '848 patents disclose track suspension systems for vehicles having a frame and a continuous rubber track. The drive wheel is attached to the frame for engaging and driving the continuous flexible track.

In certain track apparatus of the prior art, distortion of the track apparatus frame during use may cause excessive stresses thereon and failure of the track apparatus flame may result. Furthermore, the flexible track of such buck apparatus is subject to excessive forces which can result in premature wear. Unacceptable frame distortion can also interfere with efficient operation of such track apparatus. There is a need for an improved track apparatus with a frame having improved resistance to distortion.

OBJECTS OF THE INVENTION

It is an object of this invention to provide an improved track apparatus, of the type for use in place of a vehicle wheel, which overcomes some of the problems and shortcomings of the prior art, including those referred to above.

More particularly, it is an object of this invention to provide an improved back apparatus reducing or eliminating frame distortion and related problems.

Another object of the invention is to provide a track apparatus having a frame of superior strength and rigidity, and consequent improved resistance to distortion.

Yet another object of the invention to provide a track apparatus which is inexpensive and simple to manufacture.

BRIEF SUMMARY OF THE INVENTION

In accordance with the present invention, at improved track apparatus of the type mountable on the rotatable axle of a vehicle is provided with a frame of improve construction. The track apparatus, in addition to its continuous flexible track with its upper and lower portions, includes: a frame, the characteristics of which will be described below; a drive wheel rotatably mounted with respect to the frame and having an upper circumferential portion engageable with the inner surface of the upper portion of the flexible track and a lower circumferential portion spaced above the lower portion of the track; and leading and trailing idler wheels. The frame of this invention is a rigid structure including first and second side portions which define a drive wheel receipt well therebetween for receiving the drive wheel of the track apparatus.

The first and second side portions include leading apparatus therethrough and trailing apertures therethrough such that the leading apertures are in axial alignment with each other and the trailing apertures are in axial alignment with each other. The first and second side portions are interconnected by a rigid leading cross-member extending between the first side portion adjacent to the leading aperture therein and the second side portion adjacent to the leading aperture therein. In highly referred embodiments of this invention, the frame is of uni-body construction, providing excellent rigidity and case of construction.

The leading cross-member is a preferably a pivot shroud, i.e., a shroud for a pivot pin which pivotably supports a idler mounting bucket with respect to the rigid frame. Such bracket supports idler mounts for leading idler wheels. The preferred shroud for the pivot pin is most preferably a sleeve trough which the pivot pin extends to pivotably sipped the idler mounting bracket.

In preferred embodiments, the side portions are also interconnected by a rigid trailing cross-member extending between the first side portion adjacent to the trailing aperture therein and the second side portion adjacent to the trailing aperture therein. The trailing cross-member is preferably a trailing-idler-axle shroud; most preferably, the trailing shroud is a sleeve through which the trailing-idler axle extends.

The first and second side portions of the frame are preferably also interconnected by front and rear end panels.

The first side portion of the frame preferably includes a spindle hub for rotatably receiving an axle of a vehicle therein for engagement with the track apparatus drive wheel. The frame preferably also includes a bracket support arm which depends from the front panel, the bracket support arms each having a terminal end which defines one of the aforementioned two leading apertures. Such apertures provide a pivot location for pivotably receiving the pivot pin.

The preferred track apparatus includes trailing-idler support arms which extend from the rear panel. Each trailing-idler support arm preferably has one of the trailing apertures thereon. Such trailing apertures provide a location for rotatably receiving a trailing-idler axle therethrough.

In preferred embodiments, the frame includes a leading-bogey mount for rotatably supporting a leading-bogey wheel which engages the flexible track. In such preferred embodiments, the side portions are connected by a rigid leading-bogey cross-member extending between the first side portion adjacent to the leading-bogey mount and the second side portion adjacent to the leading-bogey mount. It is highly preferable that the leading-bogey cross-member be a leading-bogey axle shroud. Such a leading-bogey axle shroud is most preferably a sleeve through which the leading bogey axle extends.

The frame also preferably includes a trailing-bogey mount for rotatably supporting a trailing-bogey wheel which engages the track. The side portions are preferably further connected by a rigid trailing-bogey cross-member extending between the first side portion adjacent to the trailing-bogey mount and the second side portion adjacent to the trailing-bogey mount. It is preferred that the trailing-bogey cross-member be a trailing-bogey axle shroud. In such preferred embodiments, the trailing-bogey mount is most preferably a trailing-bogey axle and the trailing-bogey axle-shroud is a sleeve through which the trailing bogey axle extends.

The invention may be described differently as being a track apparatus having (1) a plurality of wheels engaging the inner stake of the track, including a drive wheel (as motioned above), leading and trailing idler wheels, and preferably at least one bogey wheel engaging only a middle portion of the lower length of the track, and (2) a frame for mounting the wheels. The frame has a uni-body construction such that it includes fixed-mounts in fixed relative positions. Each fixed-mount which is preferably an aperture (or pair of aligned apertures) in the frame for receiving an axle therethrough, defines an axis and provides mounting as follows:

The drive wheel is rotatably mounted to one of the fixed-mounts and turns on its axis. One of the idler wheels (a "first" idler wheel) is rotatably mounted to another of the fixed-mounts, i.e., a fixed-mount at a rearwardmost or forwardmost position on the frame, and turns on the axis of such fixed-mount. An idler-mounting bracket is pivotably mounted to another of the fixed-mounts, i.e., the fixed-mount at the opposite end of the frame (e.g., the forward most end), and such bracket pivots on the axis of such fixed-mount. The bracket itself has an idler-mount which defines an idler-mount axis at which the other idler wheel (a "second" idler wheel) is rotatably mounted in variable positions with respect to the frame. (Such idler-mount axis is spaced from and movable with respect to the axis of the fixed-mount about which the bracket pivots, to facilitate tensioning of the flexible track and accommodation of ground-surface irregularities.) Each bogey wheel (there may be one, two or more bogey wheels) is rotatably mounted to a respective one of the fixed-mounts (in an intermediate position on the frame) and turns on the axis of its respective fixed-mount.

In certain preferred embodiments, the first wheel is the trailing idler wheel and the second wheel is the leading idler wheel. In highly preferred embodiments, there are a pair of axially-aligned leading idler wheels and a pair of axially-aligned trailing idler wheels.

In other preferred embodiments, the frame defines a lateral recess receiving the drive wheel. More preferably, the frame include first and second side portions which define the lateral recess, or drive wheel receipt well.

BRIEF DESCRIPTION OF THE DRAWINGS

The drawings furnished herewith illustrate a preferred construction of the present invention in which the above advantage and apertures are dearly disclosed as well as others which will be readily understood from the following description of the illustrated embodiment.

FIG. 11 is a rear elevation of the frame.

FIG. 12 is a cross-sectional view taken along line 12—12 of FIG. 11.

FIG. 13 is a front elevation of the frame.

DETAILED DESCRIPTION OF PREFERRED EMBODIMENTS

Figure 1:
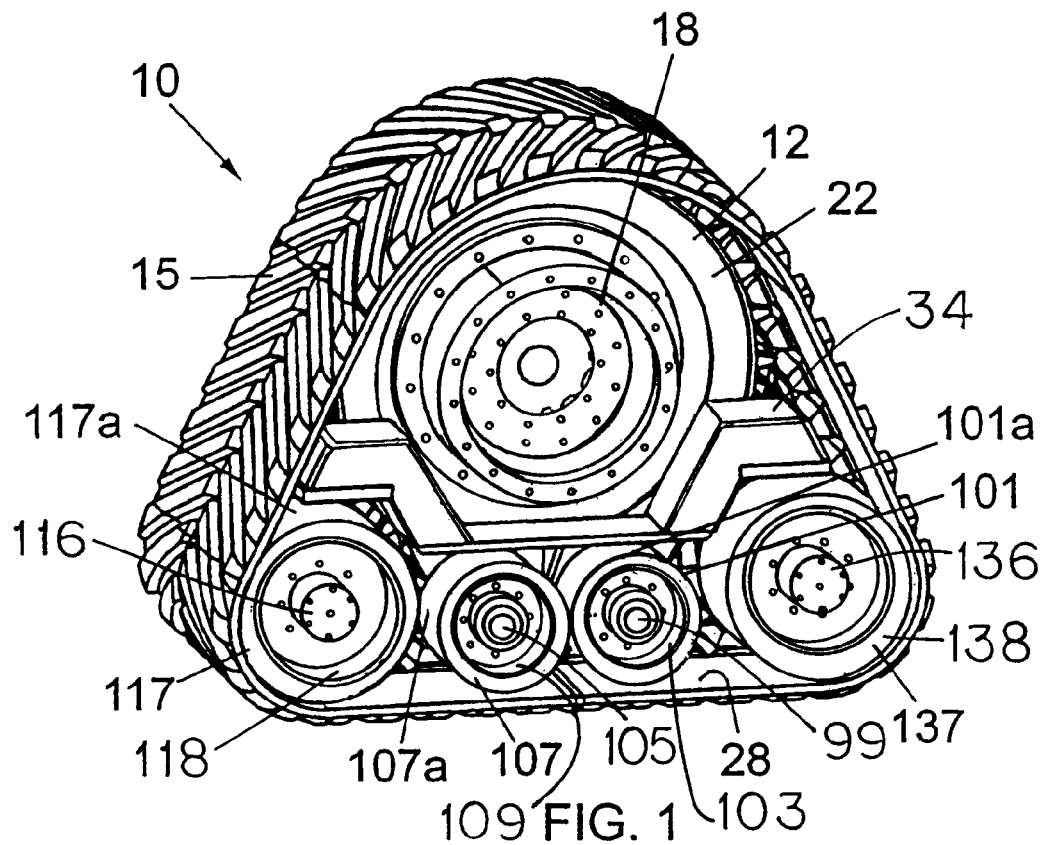
FIG. 1 is a rear isometric view of a track apparatus for a vehicle incorporating a drive wheel in accordance with the present invention.
Figure 2:
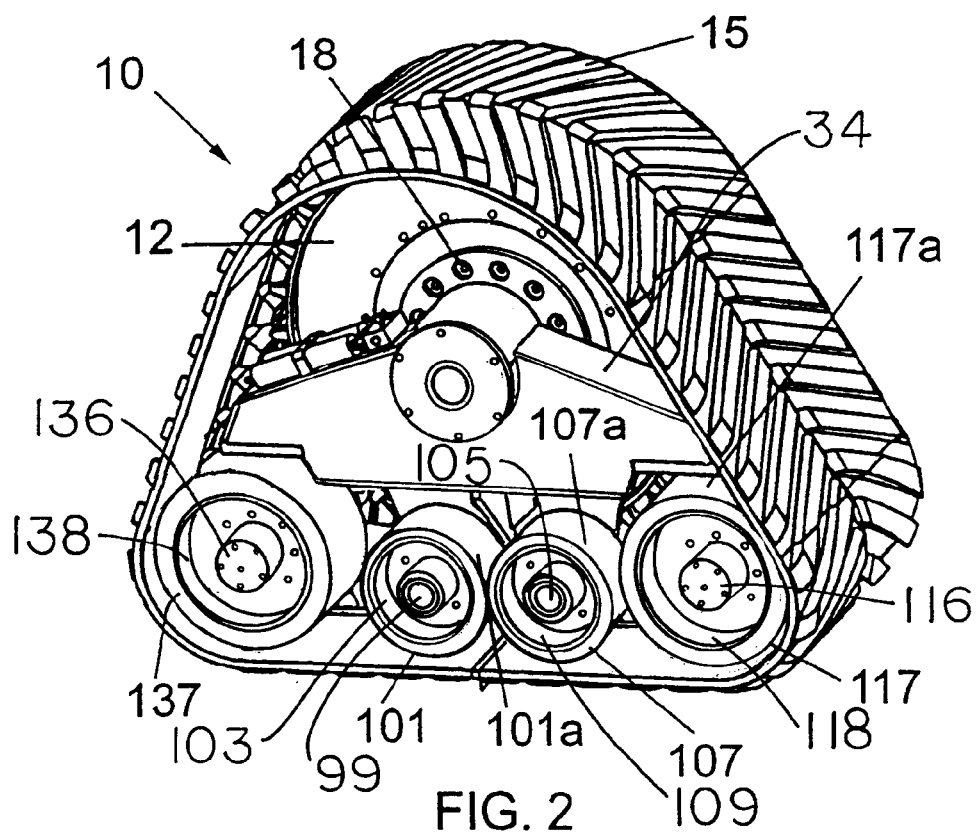
FIG. 2 is a front isometric view of the track apparatus.

Referring to FIGS. 1–2, a track apparatus is generally designated by the reference numeral 10. In a preferred embodiment, the track apparatus 10 is mounted on an axle (not shown) of an agricultural vehicle such as a tractor or combine. However, it is contemplated as being within the scope of the present invention for track apparatus 10 to be mounted on other types of vehicles such as trucks, automobiles, and the like.

Track apparatus 10 includes a drive wheel 12 which is mountable to the axle of a vehicle for rotational movement therewith in order to drive a flexible track 15. As best seen in FIG. 1, in the preferred embodiment, it is intended to mount track apparatus 10 to a vehicle having a planetary axle. However, it is contemplated to mount track apparatus 10 to a bar axle or other type of axle without deviating from the scope of the present invention.

Referring to FIG. 2, drive wheel 12 includes a firs set of circumferentially spaced attachment openings 18 therein which are aligned with corresponding openings formed in an attachment flange extending radially from the axle of the vehicle, as is conventional. Bolts extend through attachment openings 18 in drive wheel 12 axial through corresponding openings in the attachment flange of the axle and are seemed by corresponding nuts threaded on the ends thereof in order to interconnect the axle of the vehicle to drive wheel 12 so as to allow drive wheel 12 to rotate in unison with the axle of the vehicle.

Figure 3:
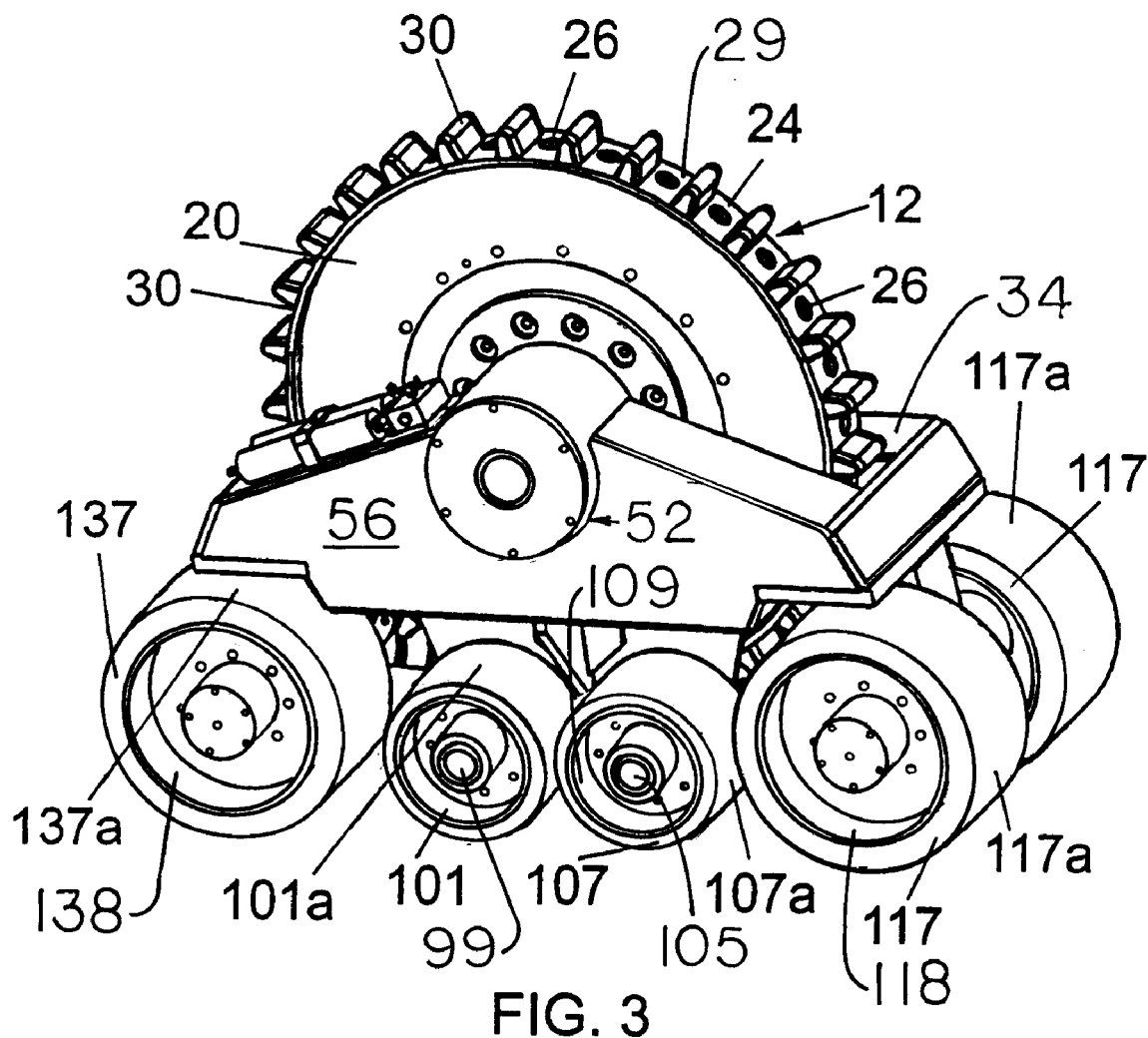
FIG. 3 is a front isometric view of the track apparatus with the flexible track removed.

As best seen in FIGS. 1–3, drive wheel 12 includes an inner wail 20 and an outer wall 22 interconnected by a radially outer rim 24. Outer rim 24 includes a plurality of circumferentially spaced openings 26 therein for allowing debris which may accumulate on the inner surface 28 of flexible track 15 to pass therethrough. Outer rim 24 further includes an outer surface 29 having a plurality of circumferentially spaced drive members 30 projecting radially therefrom. As hereinafter described, drive members 30 are intended to engage corresponding track lugs 32 projecting inwardly from the inner source 28 of flexible track 15 in order to drive flexible track 15.

As best seen in FIGS. 7–13, track apparatus 10 further includes frame 34 of uni-body construction. Frame 34 includes first and second side portions 36 and 38, respectively, which define a drive wheel receipt wheel 40 therebetween for receiving drive wheel 12. Side portions 36 and 38 of frame 4 are interconnected by front and rear end panels 42 and 44, respectively.

Side portion 36 includes first and second upper peels 46 and 48, respectively, which extend laterally from outer surface 50 of generally tubular spindle hub 52 and a lower panel 53. Spindle hub 52 forms one of several "fixed-mounts" on frame 34. Side panel 56 interconnects first sides 46a and 48a of upper panels 46 and 48, respectively, and first side 53a of lower panel 53. Side panel 54 acts from second sides 46b and 48b of upper panels 46 and 48, respectively, and is joined to second side 53b of lower panel 53. A support member 60 extends between outer surface 54b of side panel 54 and lower surface 62 of lower panel 53 to add strength and stability to side panel 54 during operation of track apparatus 10. In the preferred embodiment, support member 60 takes the form of a gusset, but other configurations are possible without deviating from the scope of the present invention.

Side panel 54 includes leading and trailing intermediate apertures 64 and 66, respectively, therethrough for receiving corresponding leading and trailing bogey axles, respectively, as hereinafter described. Reinforcement elements 64a and 66a may be mounted on outer surface 54b of side panel 54 about corresponding apertures 64 and 66, respectively, to reinforce apertures 64 and 66 and prevent deformation of the same by the bogey axles received therein. Apertures 64 and 66 are "fixed-mounts" used for mounting bogey wheels.

Side portion 32 of frame 34 includes generally tubular forward and rearward arms 70 and 72, respectively. Forward arm 70 includes a first end 74 which is joined to front end panel 42. Similarly, rearward arm 72 includes a first end 76 joined to rear end panel 44. Second ends 78 ad 80 of forward and rearward arms 70 and 72, respectively, an interconnected to the upper surface 82 of a generally horizontal base plate 84. Base plate 84 includes a inner edge 86 directed toward drive wheel receipt well 40 and an outer edge 88. Side panel 90 depends from inner edge 86 of base plate 84 and includes leading and trailing intermediate apertures 92 and 94, respectively; leading aperture 92 in side panel 90 of side portion 38 is axially aligned with leading aperture 64 in side panel 54 of side portion 36, and trailing aperture 94 in side panel 90 of side portion 38 is similarly axially aligned with trailing aperture 66 in side panel 54 of side portion 36. Aperture pair 64 and 92 receive a leading bogey axle and aperture pair 66 and 94 similarly receive a trailing bogey axle, as hereinafter described.

Reinforcement elements 92a and 94a may be mounted on outer surface 90b of side panel 90 about corresponding apertures 92 and 94, respectively, to reinforce apertures 92 and 94 and prevent deformation of the same by the bogey axles received therein. Outer surface 90b of side panel 90 of side portion 38 is interconnected to the lower surface 98 of base plate 84 by a support structure 100 to add strength and stability to side panel 90. In the preferred embodiment, support member 100 takes the form of a gusset, but other configurations are possible without deviating from the scope of the present invention.

A leading bogey axle 99 extends through leading aperture 64 in side panel 54 and through leading aperture 92 in side panel 90. Leading bogey wheels 101 are mounted on rims 103 (see FIGS. 1–2) in a conventional manner which, in turn, an mounted on corresponding ends of leading bogey axle 99 in a conventional manner for rotational movement therewith. The outer surfaces 101a of leading bogey wheels 101 engage the inner surface 28 of flexible track 15.

Similarly, a tailing bogey axle 105 extends though trailing aperture 66 in side panel 54 and through trailing aperture 94 in side panel 90. Trailing bogey wheels 107 are mounted on rims 109 (see FIGS. 1–2) in a conventional manner which, in turn, mounted on opposite ends of trailing bogey axle 105 in conventional manner for rotational movement therewith. The outer surfaces 107a of trailing bogey wheels 107 engage the inner surface 28 of flexible track 15.

Figure 4:
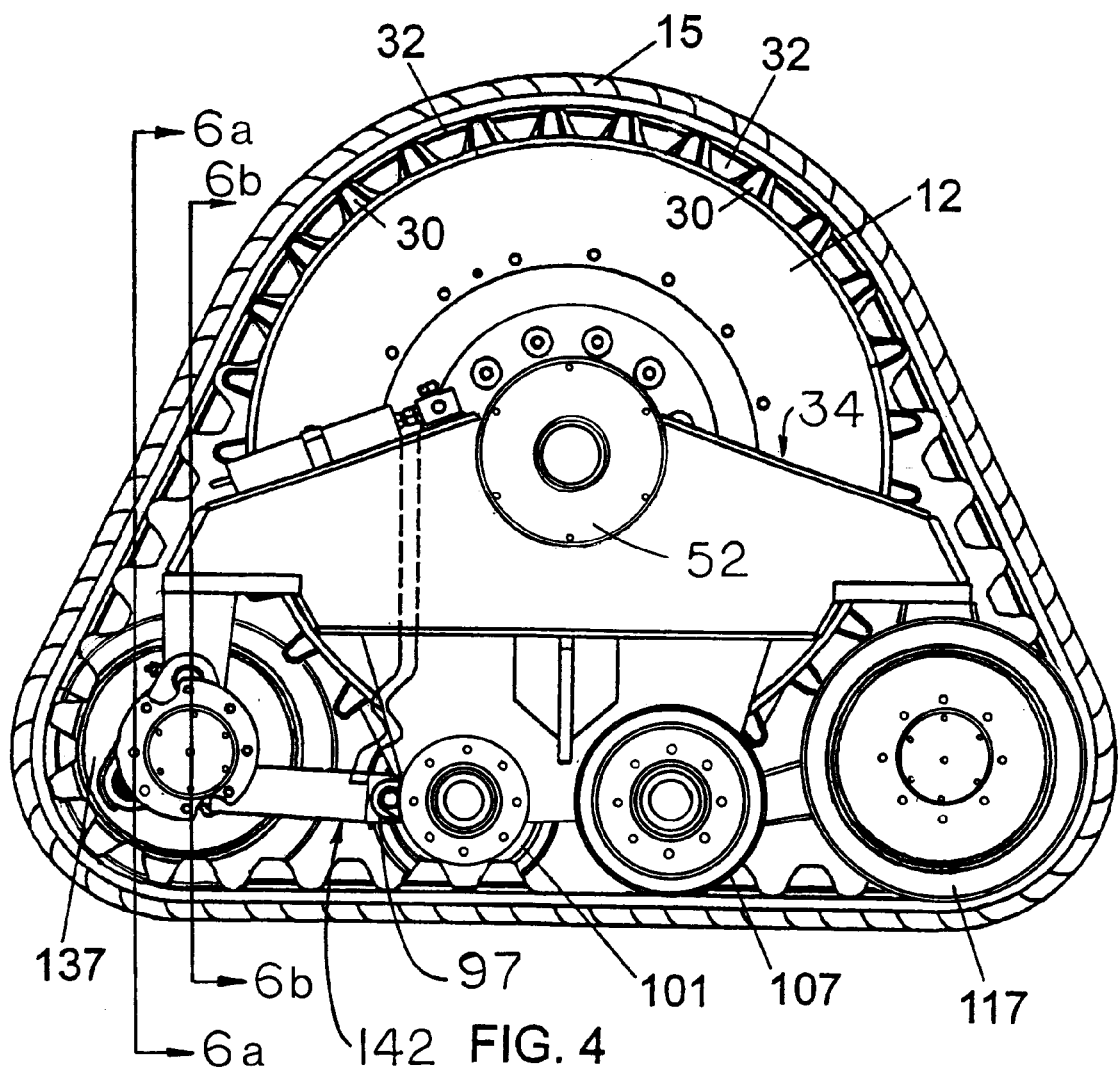
FIG. 4 is a front elevation of the track apparatus.

Inner surface 54a of side panel 54 of side portion 36 is interconnected to inner surface 90a by leading and trailing bogey axle shrouds 102 and 104, respectively, which are cross-members between side panels 54 and 90. Leading bogey axle shroud 102 is generally arcuate in shape and has a first end positioned adjacent to leading aperture 64 in side panel 54 of side portion 36 and a second opposite end 102b adjacent to leading aperture 92 in side panel 90 of side portion 38 so as auto partially surround leading bogey axle 99. First and second spaced mounting flanges 95 and 97 project from leading bogey axle shroud 102, and include corresponding openings 95a and 97a, respectively, therein for reasons related to mounting of tensioning apparatus 142 (see FIGS. 4 and 5), unrelated to this invention. Trailing bogey axle shroud 104 is arcuate in shape and includes a first end positioned adjacent to trailing aperture 66 in side panel 54 of side portion 36 and a second end 104b positioned adjacent to trailing aperture 94 in side panel 90 of side portion 38 so as to partially surround trailing bogey axle 105.

Frame 34 further includes a trailing idler axle support arm 110 which extends between trailing bogey axle shroud 104 and rear end panel 44. Trailing idler axle support arm 110 include, a generally tubular trailing idler axle support 112, which is another of the "fixed-mounts" on frame 34. One of the two opposite aides of trailing idler axle support arm 110 may be regarded as an extension of, and thus part of, side panel 54 of side portion 36 of frame 34; and the other of the two opposite sides of trailing idler axle support arm 110 may be regarded as an extension of, and thus part of, side panel 90 of side portion 38 of frame 34. And, the opposite end openings in tubular trailing idler axle support 112 in effect are apertures in the side portions 36 and 38 of frame 34, and form another "fixed-mount" therein.

Trailing idler axle support 112 has an inner surface 114 for rotatably supporting trailing idler axle 116. Trailing idler wheels 117 are mounted on rims 118 (see FIGS. 1–2) in a conventional manner which, in turn, are mounted on corresponding ends of trailing idler axle 116 in a conventional manner for rotational movement therewith. Trailing idler wheels 117 include radially outer surfaces 117a for engaging the inner surface 28 of flexible track 15.

Figure 5:
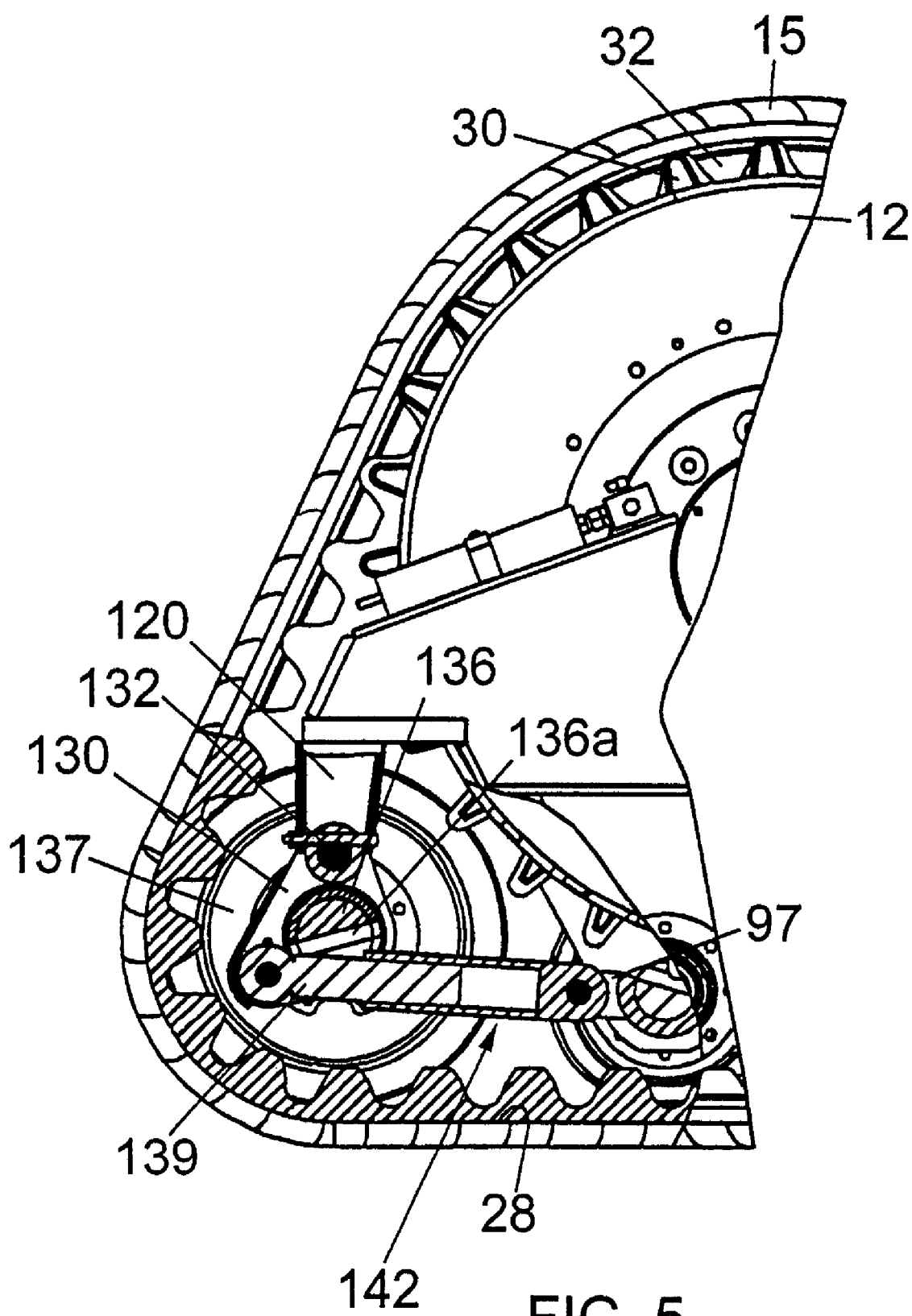
FIG. 5 is a fragmentary front elevation, partially in section, of the back
Figure 6B:
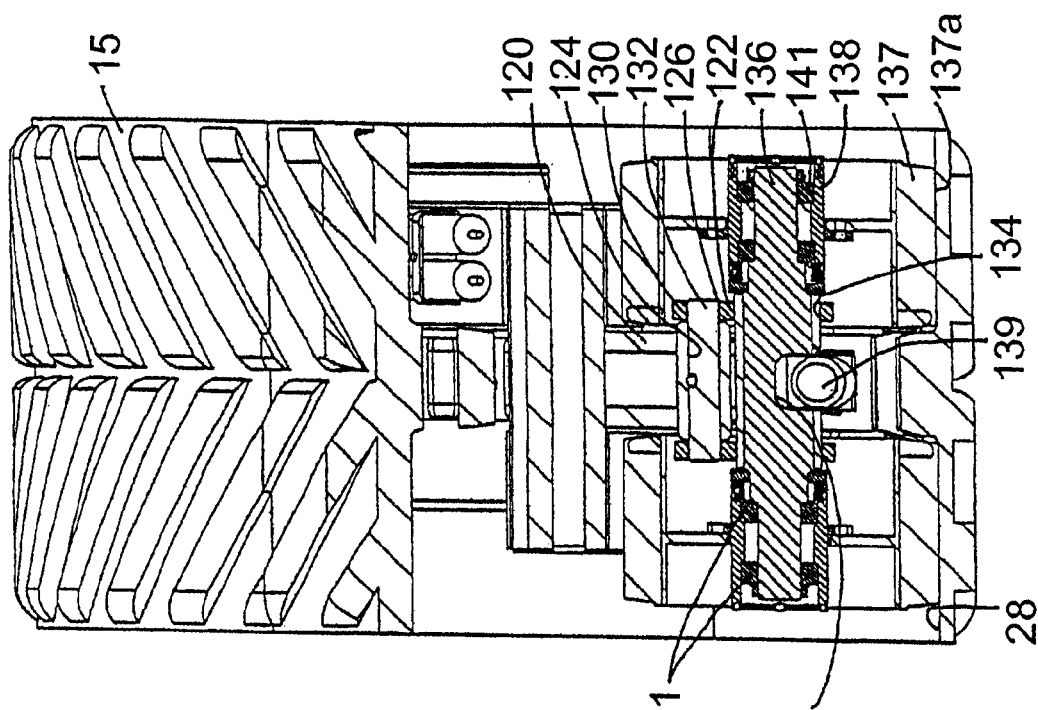
FIG. 6b is a cross-sectional view taken along line 6b—6b of FIG. 4.
Figure 6A:
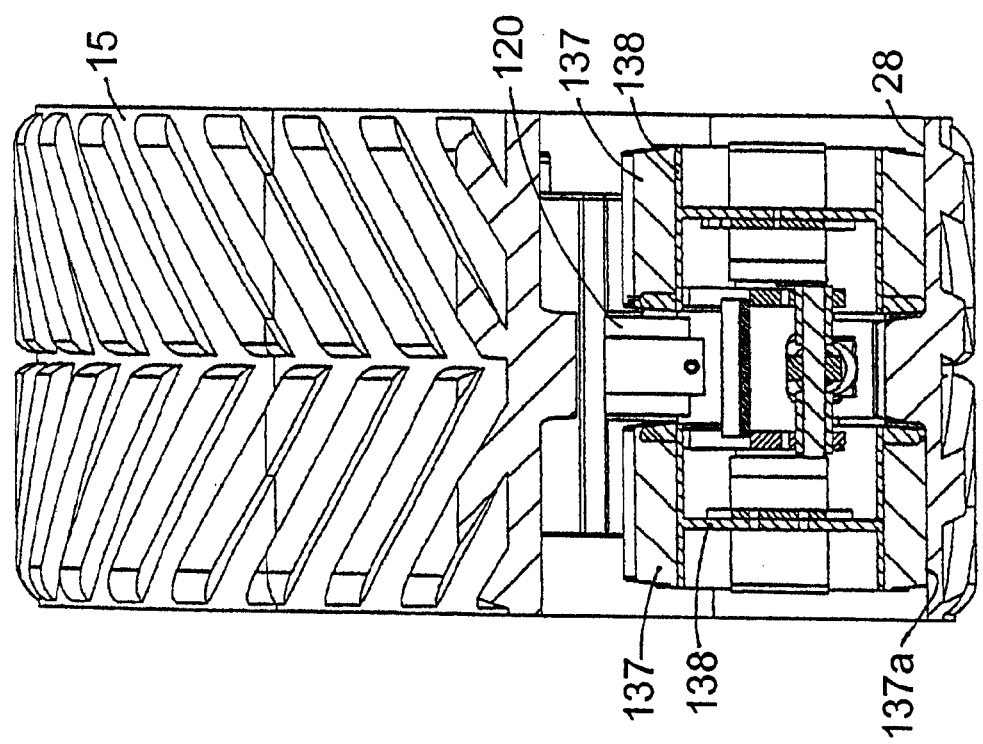
FIG. 6a is a cross-sectional view taken along line 6a—6a of FIG. 4.
Figure 7:
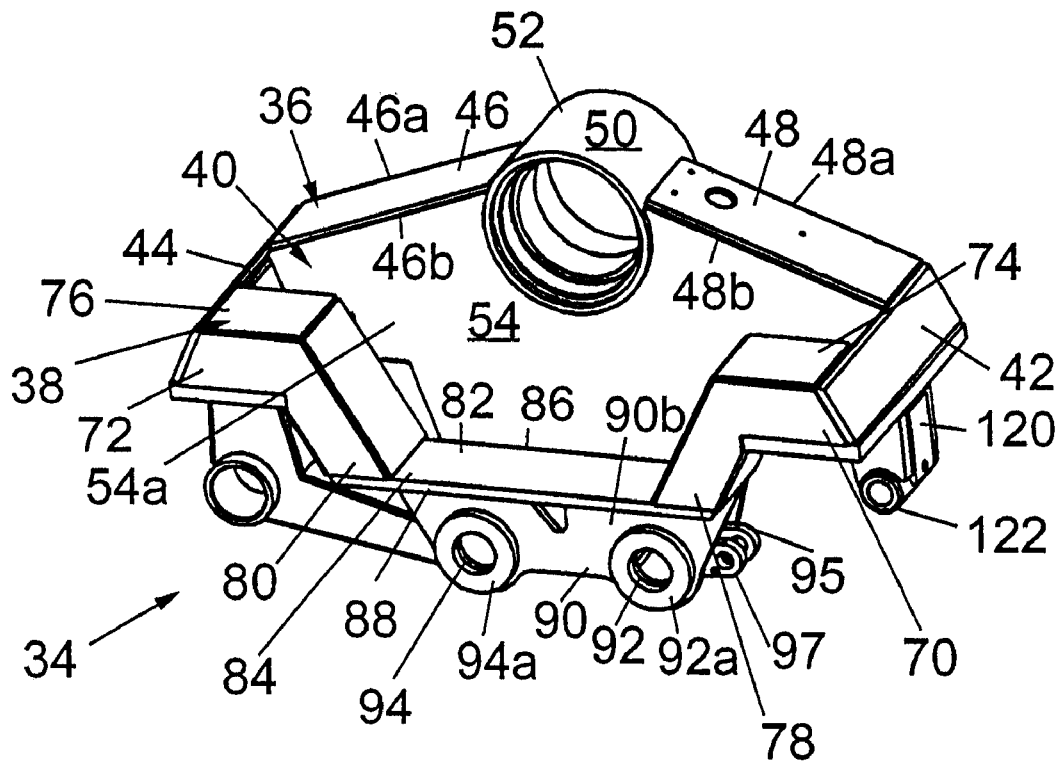
FIG. 7 is a rear isometric view of the frame of the track apparatus of FIG. 1.
Figure 8:
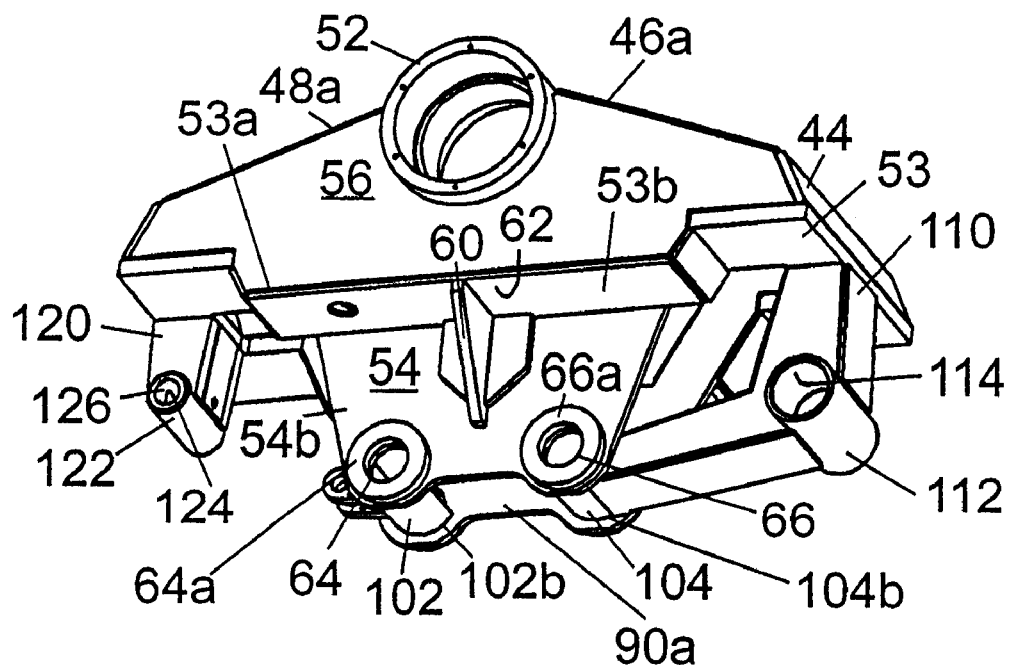
FIG. 8 is a front isometric view of the frame.
Figure 9:
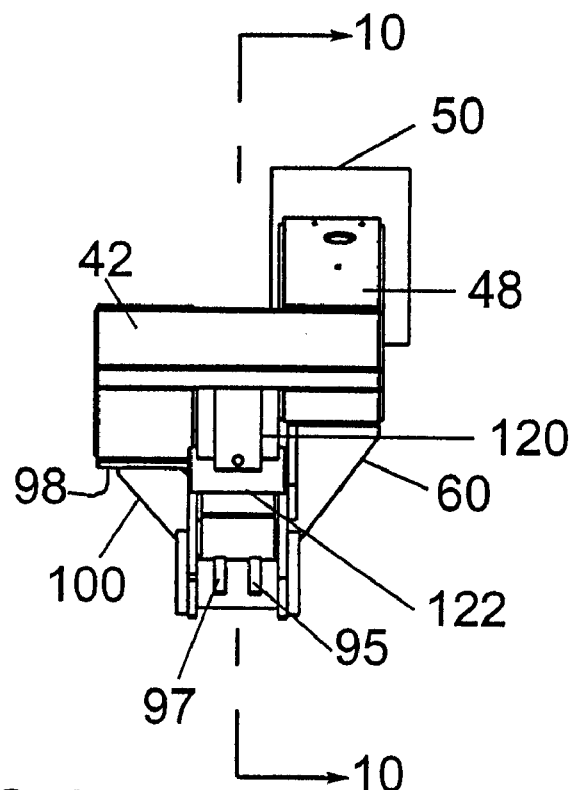
FIG. 9 is a side elevation of the frame.
Figure 10:
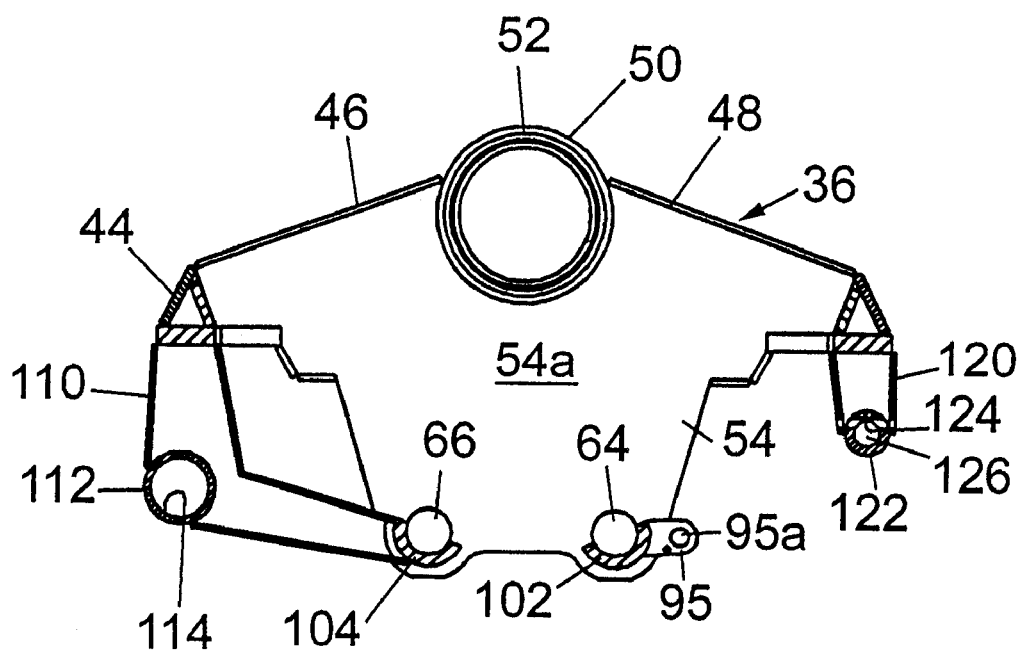
FIG. 10 is a cross-sectional view taken along line 10—10 in FIG. 9.

Frame 34 further includes a leading idler bracket support arm 120 depending from front end panel 42. Referring to FIGS. 5 and 6a–6b, leading idler axle support arm 120 has a generally tubular terminal end 122 having a inner surface 124 defining a passageway 126 therethrough. One of the two opposite sides of leading idler bracket support arm 120 may be regarded as an extension of, and thus part to side panel 54 of side portion 36 of frame 34. And the to of the two opposite sides of leading idler bracket support arm 120 may be regarded as an extension of and thus part of, side panel 90 of side portion 38 of frame 34. And, the opposite end openings in tubular end 122 in effect are apertures in the side portions 36 and 38 of frame 34, and form still another "fixed-mount" therein.

Leading idler-mounting bracket 130 is pivotally mounted to leading idler support arm 120 by pivot pin 132 extending through passageway 126 in terminal end 122. Leading idler-mounting bracket 130 includes a leading idle axle passageway 134 for allowing leading idler axle 136 to pass therethrough. Leading idler axle 136 includes a notch 136a formed therein for allowing piston shaft 139 of cylinder 142 to extend therepast.

As is conventional, leading idler axle 136 supports leading idler wheels 137 on opposite ends thereof. Leading idler wheel 137 are mounted on rims 138 which, in turn, are mounted on corresponding ends of leading idler axle 136 in a conventional manner for rotational movement therewith. It is contemplated to provide bearing, 141 between rims 138 and corresponding ends of leading idler axle 136 to facilitate rotation of leading idler wheels 137 thereabout leading idler wheels 137 include a radially outer surface 137a for engaging the inner surface 28 of flexible track 15.

In operation, track apparatus 10 is mounted to an axle of a vehicle through drive wheel 12 as heretofore described. The axle of the vehicle is rotated in a conventional manner through the vehicle by its engine and through a transmission which can vary the speeds and allow for forward and reverse rotation. Flexible tack 15 of link apparatus 10 is positioned over drive wheel 12 such that track tugs 32 projecting from the inner surface 28 of flexible track 15 are received between corresponding pairs of drive members 30 projecting from outer surface 29 of outer rim 24 of drive wheel 12. As drive wheel 12 rotates drive member 3 successively engage corresponding track lugs 32 and drive flexible track 15 about drive wheel 12.

Flexible track 15 extends from drive wheel 12 around leading idler wheels 137, leading and trailing bogey wheels 101 and 107 and trailing idle wheels 117. As is apparent flexible track 15 is in the form of a continuous loop. The aforementioned tensioning apparatus 142 serves to adjust the position of leading idler wheels 137 (carded by idler-mounting bracket 130) relative to passageway or "fixed-mount" 126, thereby allowing tension adjustment and leading idler wheel deflection in response to obstructions and other surface irregularities encountered by the vehicle.

All other wheels on which track 15 is mounted, including drive wheel 12, trailing idler wheels 117, and leading and trailing bogey wheels 101 and 107, are mounted in reliably fixed positions relative to one another, on the aforementioned "fixed-mounts" of uni-body frame 34. The track apparatus frame of the invention avoids or minimizes frame distortion, and the problems related thereto.

Various modes of carrying out the invention are contemplated as being within the scope of the following claims particularly pointing out and distinctly claiming the subject matter as regarded as the invention.

What is claimed is:

1. A track apparatus including a continuous flexible track having upper and lower lengths and an inner surface; a frame; a drive wheel structure rotatably mounted with respect to the frame and having an upper circumferential portion engaging the inner surface of the flexible track along the upper length and a tower circumferential portion spaced above the lower track length; and an idler assembly connected to the frame and having an idler wheel engaging the track, the improvement wherein:

the frame includes first and second side portions defining a drive wheel receipt well therebetween for receiving the drive wheel;

the first and second side portions include leading apertures therethrough and trailing apertures therethrough such that the leading apertures are in axial alignment with each other and the trailing apertures are in axial alignment with each other, the leading apertures adapted to mount a pair of aligned wheels, the aligned wheels defining an inter-wheel space; and the first and second side portions are interconnected by a rigid leading cross-member extending between the first side portion adjacent to the leading aperture therein and the second side portion adjacent to the leading aperture therein and positioned in the inter-wheel space.

2. The track apparatus of claim 1 wherein the leading cross-member is a pivot shroud.

3. The track apparatus of claim 2 wherein a pivot pin passes through the leading apertures and the pivot shroud sleeve though which the pivot pin extends.

4. The track apparatus of claim 1 wherein the frame is of uni-body construction.

5. The track apparatus of claim 1 wherein the side portions are interconnected by a rigid trailing cross-member extending between the first side portion adjacent to the trailing aperture therein and the second side portion adjacent to the trailing aperture therein.

6. The track apparatus of claim 5 wherein the trailing cross-member is a trailing-idler-axle shroud.

7. The track apparatus of claim 6 wherein a trailing-idler axle passes through the trailing apertures and the trailing-idler-axle shroud is a sleeve through which the trailing-idler axle extends.

8. The track apparatus of claim 1, wherein the first side portion of the frame includes a spindle hub for rotatably receiving an axle of a vehicle therein.

9. The track apparatus of claim 1, wherein the side portions of the frame are interconnected by front and rear panels.

10. The track apparatus of claim 9 wherein the frame includes bracket support arms depending from the front panel, each bracket support arm having a terminal end with one of leading apertures thereon, the leading apertures pivotably receiving a pivot pin therethrough.

11. The track apparatus of claim 10 wherein the frame includes trailing-idler support arms extending from the rear panel, each trailing-idler support arm having one of the trailing apertures thereon, the trailing apertures rotatably receiving a trailing-idler axle therethrough.

12. The track apparatus of claim 1, wherein the frame further comprises a leading-bogey mount for rotatably supporting a leading-bogey wheel which engages the flexible track.

13. The track apparatus of claim 12 wherein to side portions are connected by a rigid leading-bogey cross-member extending between the first side portion adjacent to the leading-bogey mount and the second side portion adjacent to the leading-bogey mount.

14. The track apparatus of claim 13 wherein the leading-bogey cross-member is a leafing-bogey axle shroud.

15. The track apparatus of claim 14 wherein the leading-bogey mount is a leading- bogey axle and the leading-bogey axle-shroud is a sleeve through which the leading bogey axle extends.

16. The track apparatus of claim 12 wherein the frame further comprises a trailing-bogey mount for rotatably supporting a trailing-bogey wheel which engages the track.

17. The track apparatus of claim 16 wherein the side portions are connected by a rigid trailing-bogey cross-member extending between the first side portion adjacent to the trailing-bogey mount and the second side portion adjacent to the trailing-bogey mount.

18. The track apparatus of claim 17 wherein the trailing-bogey cross-member is a trailing-bogey axle shroud.

19. The track apparatus of clam 18 wherein the trailing-bogey mount is a trailing- bogey axle and the trailing-bogey axle-shroud is a sleeve through which the trailing-bogey axle extends.

20. In a track apparatus including (a) a continuous flexible track having upper and lower lengths and an inner surface, (b) a plurality of wheels engaging the inner surface of the track, including a drive wheel having a upper circumferential potion engaging only a middle portion of the upper length of the track, leading and trailing idler wheels, and at least one bogey wheel engaging only a middle portion of the lower length of the track, and (c) a frame for mounting the wheels; the improvement wherein:

the flame has a uni-body construction such that it includes fixed-mounts in fixed relative positions, each fixed-mount defining an axis, the drive wheel is rotatably mounted to one of the fixed-mounts and turns on the respective fixed-mount axis, one of the idler wheels is rotatably mounted to one of the fixed-mounts and turns on the respective fixed-mount axis, the at least one bogey wheel is rotatably mounted to one of the fixed-mounts and turns on the respective fixed-mount axis, and an idler-mounting bracket is pivotably mounted to another of the fixed-mounts and pivots on the respective fixed-mount axis, the bracket having an idler-mount defining an idler-mount axis at which the other idler wheel is rotatably mounted in variable positions with respect to the frame.

21. The track apparatus of claim 20 wherein the frame defines a lateral recess receiving the drive wheel.

22. The track apparatus of claim 20 wherein the frame includes a spindle hub for rotatably receiving an axle of a vehicle therein.

23. The track apparatus of claim 20 wherein the fixed-mounts comprise apertures for receiving axles therethrough.

24. The track apparatus of claim 20 wherein the trailing idler wheel is rotatably mounted to one of the fixed-mounts and the leading wheel is rotatably mounted to the idler-mount.

25. The track apparatus of claim 24 wherein the trailing idler wheel comprises a pair of axially-aligned wheels and the leading idler wheel comprises a pair of axially-aligned wheels.

26. A track apparatus mountable on an rotatable axle of a vehicle, comprising:

a continuous flexible track having upper and lower lengths and an inner surface, a drive wheel structure mountable on the axle for rotational movement therewith and having an upper circumferential portion engaging the inner surface of the flexible track along only a middle portion of the upper length;

a frame of uni-body construction, the frame including a bracket support arm and a trailing-idler support arm, the trailing-idler support arm defining a trailing-idler mount having a trailing-idler rotational axis passing through paired apertures and a cross-member extending between the paired apertures and the bracket support arm defining a bracket mount having a bracket pivot axis;

a bracket pivotably mounted on the bracket mount so that it pivots on the bracket pivot axis, the bracket having a leading-idler support defining a leading-idler rotational axis;

a leading-idler wheel mounted to the leading-idler support and turning on the leading-idler rotational axis, the leading-idler wheel engaging the flexible track; and a pair of aligned trailing-idler wheels mounted to the trailing-idler mount and turning on the trailing-idler rotational axis, the trailing-idler wheels defining an inter-wheel space therebetween and engaging the flexible track, the cross-member positioned in the inter-wheel space.

27. The track apparatus of claim 26 wherein the frame includes at least on bogey mount located between the leading-idler mount and trailing-idler mount and having a bogey rotational axis, and further comprising at least one bogey wheel rotatably mounted to the at least one bogey mount and turning on the bogey rotational axis, the at least one bogey wheel engaging only a middle portion of the lower length of the track.

28. The track apparatus of claim 26 wherein the frame includes first and second side portions defining a drive wheel receipt well therebetween for receiving the drive wheel.

29. The track apparatus of claim 28 wherein each mount comprises a pair of axially aligned apertures, the pair defined by one aperture in the first side portion and one aperture in the second side portion.

30. The track apparatus of claim 29 wherein the side portions are connected by cross-members which extend between the side portions adjacent to the paired aperture.

31. The track apparatus of claim 30 wherein the cross-members are shrouds.

32. The track apparatus of claim 31 wherein each mount is an axle and each shroud is a sleeve through which a mount passes.

\* \* \* \* \*

UNITED STATES PATENT AND TRADEMARK OFFICE
CERTIFICATE OF CORRECTION

PATENT NO.    : 6,557,953 B1
DATED         : May 6, 2003
INVENTOR(S)   : Glenn W. Kahle et al.

It is certified that error appears in the above-identified patent and that said Letters Patent is hereby corrected as shown below:

Column 1,
Lines 13, 29 and 32, delete "pound" and insert -- ground --.
Line 16, delete "mid" and insert -- and --.
Line 17, delete "dyes" and insert -- tires --.
Line 19, delete "crop" and insert -- crops --.
Line 26, delete "wit" and insert -- with --.
Line 35, delete "print" and insert -- present --.
Line 44, delete "buck" and insert -- track --.
Line 57, delete "back" and insert -- track --.
Line 66, delete "at" and insert -- an --.

Column 2,
Lines 14-15, delete "apparatus" and insert -- apertures --.
Line 27, delete "bucket" and insert -- bracket --.
Line 30, delete "sipped" and insert -- support --.

Column 3,
Line 12, delete "stake" and insert -- surface --.
Line 57, delete "apertures are dearly" and insert -- features are clearly --.

Column 4,
Line 2, delete "back" and insert -- track apparatus. --.
Line 43, after "12" delete "axial" and insert -- and --.
Line 44, delete "seemed" and insert -- secured --.
Line 59, delete "source" and insert -- surface --.
Line 66, after "frame" delete "4" and insert -- 34 --.

Column 5,
Line 7, delete "acts" and insert -- projects --.
Line 26, after "portion" delete "32" and insert -- 38 --.
Line 30, after "78" delete "ad" and insert -- and --.
Line 31, after "respectively," delete "an" and insert -- are --.
Line 33, after "includes" delete "a" and insert -- an --.
Line 61, after "turn," delete "an" and insert -- are --.

UNITED STATES PATENT AND TRADEMARK OFFICE
CERTIFICATE OF CORRECTION

PATENT NO.    : 6,557,953 B1
DATED         : May 6, 2003
INVENTOR(S)   : Glenn W. Kahle et al.

It is certified that error appears in the above-identified patent and that said Letters Patent is hereby corrected as shown below:

Column 6,
Line 2, after "in turn," insert -- are --.
Line 14, after "so as" delete "auto" and insert -- to --.
Line 31, delete "aides" and insert -- sides --.
Line 51, after "having" delete "a" and insert -- an --.
Line 54, after "part" delete "to" and insert -- of, --.
Line 55, after "frame" delete "34. And the to" and insert -- 34; and the other --.
Line 57, after "extension of" insert -- , --.

Column 7,
Line 6, delete "wheel" and insert -- wheels --.
Line 9, delete "bearing, 141" and insert -- bearings 141 --.
Line 11, delete "thereabout leading" and insert -- thereabout. Leading --.
Line 19, delete "tack 15 of link" and insert -- track 15 of track --.
Line 20, delete "tugs" and insert -- lugs --.
Line 24, after "rotates" insert -- , -- and after "member" delete "3" and insert -- 30 --.
Line 29, after "apparent" insert -- , --.

Column 8,
Line 33, after "one of" insert -- the --.
Line 50, delete "leafing-bogey" and insert -- leading-bogey --.
Line 65, delete "clam" and insert -- claim --.

Column 9,
Line 4, after "having" delete "a" and insert -- an --.
Line 9, after "wheels" delete ";" and insert -- , --.
Line 37, after "leading" insert -- idler --.
Line 46, after "surface" delete "," and insert -- ; --.

UNITED STATES PATENT AND TRADEMARK OFFICE
CERTIFICATE OF CORRECTION

PATENT NO.    : 6,557,953 B1
DATED         : May 6, 2003
INVENTOR(S)   : Glenn W. Kahle et al.

It is certified that error appears in the above-identified patent and that said Letters Patent is hereby corrected as shown below:

Column 10,
Line 26, delete "on" and insert -- one --.
Line 42, delete "aperture" and insert -- apertures --.

Signed and Sealed this

Twenty-first Day of October, 2003

JAMES E. ROGAN
*Director of the United States Patent and Trademark Office*